United States Patent Office 3,469,159
Patented Sept. 23, 1969

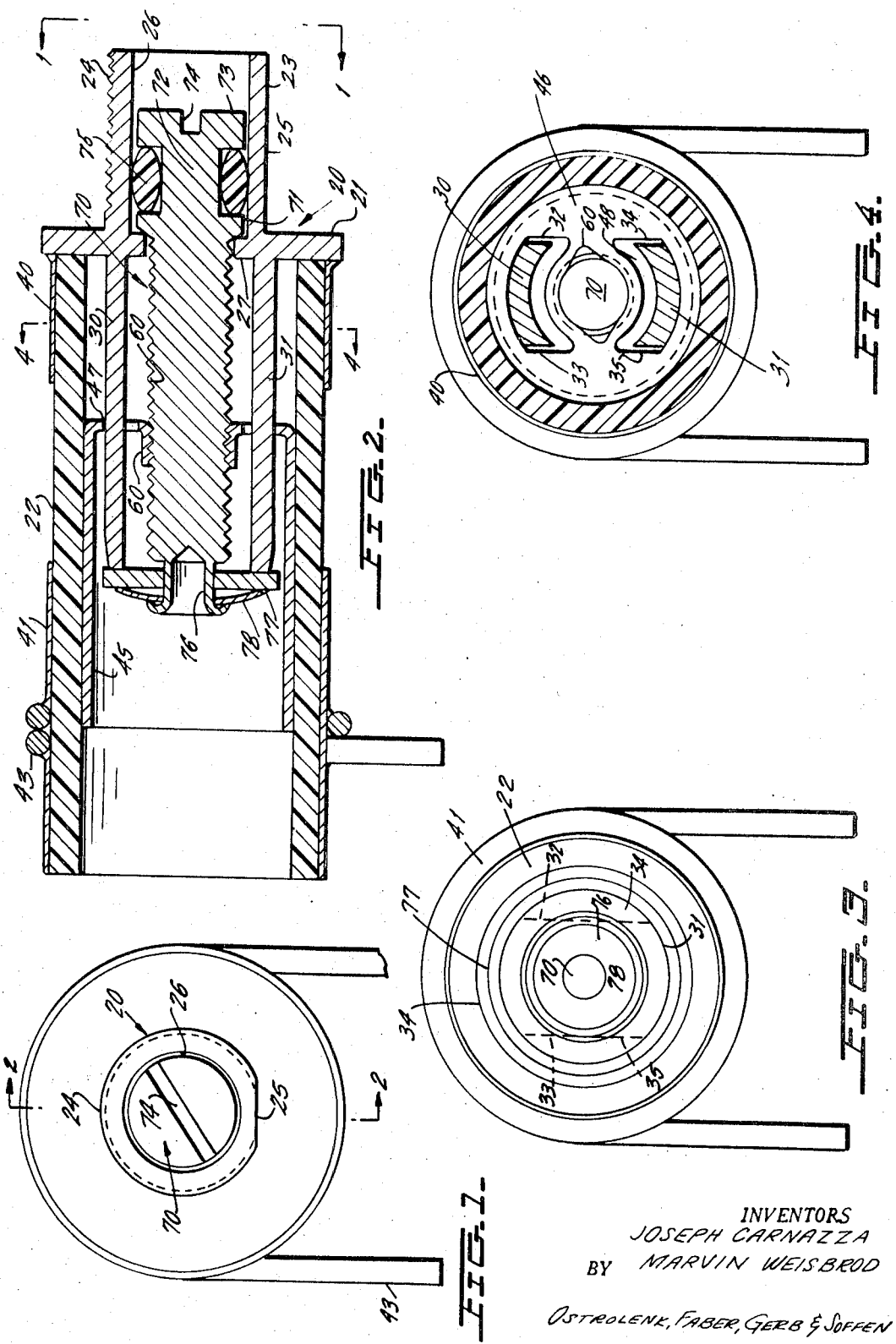

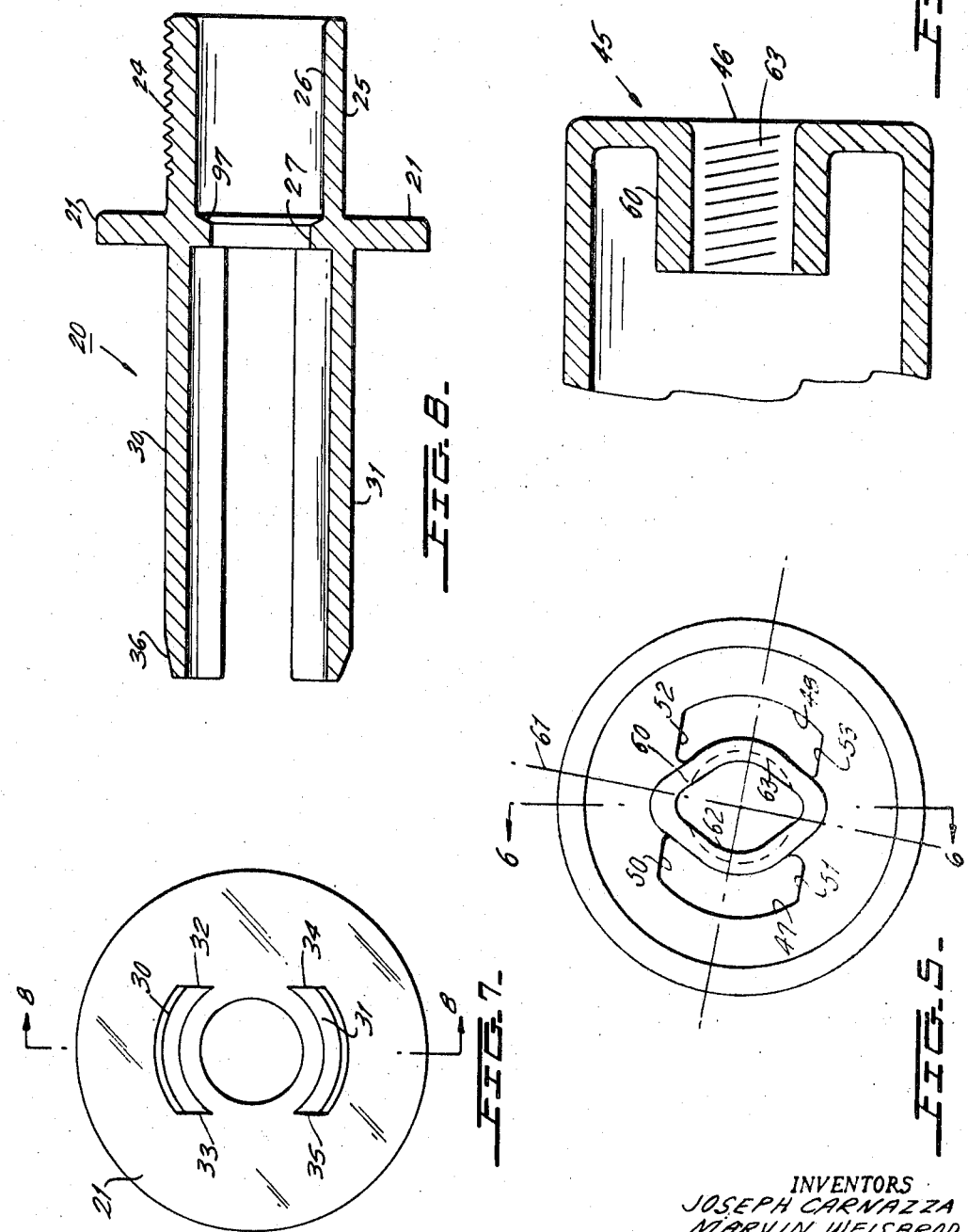

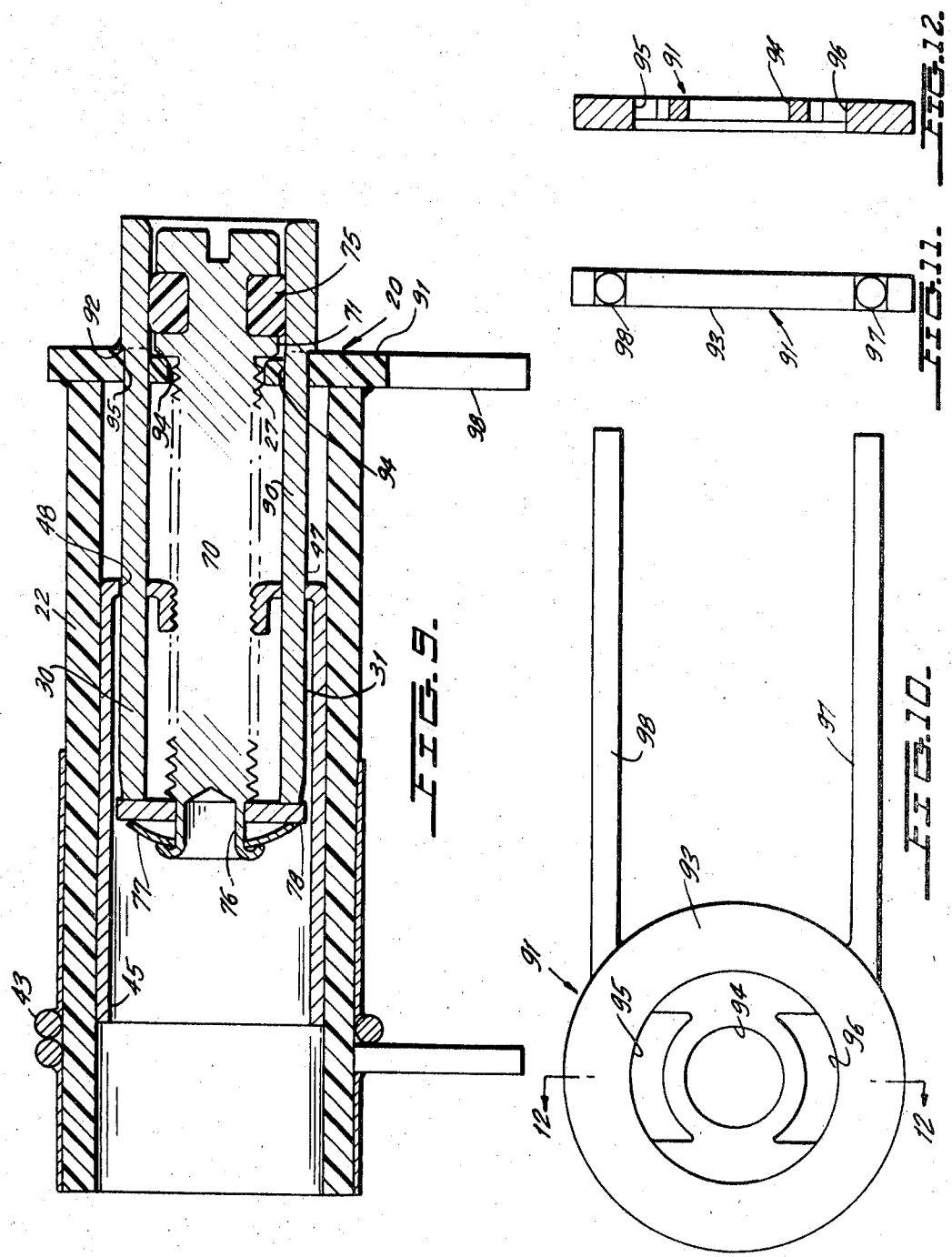

3,469,159
PISTON TRIMMER CAPACITOR
Joseph Carnazza and Marvin Weisbrod, Brooklyn, N.Y., assignors, by mesne assignments, to JFD Electronics Corporation, Brooklyn, N.Y., a corporation of Delaware
Filed Nov. 20, 1967, Ser. No. 684,398
Int. Cl. H01g 5/01
U.S. Cl. 317—249                                    11 Claims

ABSTRACT OF THE DISCLOSURE

A trimmer capacitor has an axially movable nonrotating piston in which the end of the piston is inwardly formed with an oval tube which is interiorly threaded to receive a rotating adjustment screw. Two opposing arcuate slots are formed in the piston having parallel, straight edges for receiving guide rails extending from the support bushing to prevent piston rotation. The two arcuate slots are symmetrical about the piston axis, while the oval screw-receiving tube is rotated about 10° with respect to the axis of symmetry of the two slots.

---

This invention relates to piston trimmer capacitors having a non-rotating axially movable piston, and more specifically relates to a novel piston structure having an internal threaded oval tube extending inwardly from the piston end and surrounded by piston guide slots, which receive the extending guide members from the main support bushing which prevent piston rotation.

This invention is an improvement of the structure shown in copending application Ser. No. 183,512, filed Mar. 29, 1962, in the name of Hugo Seiden, entitled "Direct Travel Mechanism," and assigned to the assignee of the present invention, now U.S. Patent No. 3,360,697, and is related to copending application Ser. No. 684,144, filed Nov. 20, 1968, in the name of Joseph Carnazza, entitled "Improved Bushing Structure for Non-Rotating Piston Trimmer Capacitor," and is also assigned to the assignee of the present invention.

Piston trimmer capacitors having a non-rotating piston are well known to the art wherein a movable piston, comprising the movable electrode of a capacitor, has an end wall containing two symmetrically disposed slots which receive two symmetrically disposed guide posts extending from the main support bushing. The end of the piston wall also commonly contains a threaded opening for receiving the adjustment screw which is carried in the support bushing, and is rotatable without, however, being axially movable. Thus, when the adjustment screw is rotated, the piston will move axially without rotating because of the fixed guide posts extending through the slots in the piston bottom wall.

In order to control the adjustment torque required to rotate the screw and to absorb backlash between the adjustment screw and piston, a number of various types of spring backlash arrangements have been used.

In accordance with the present invention, the piston bottom is formed with a novel extruded oval cylinder extending inwardly of the piston and having a thread therein for receiving the adjustment screw. The oval shape of the extension defines a flexible tube which flexes inwardly at a predetermined spring rate in order to receive the adjustment screw with a specified torque, to set the torque required to rotate the adjustment screw and to absorb any backlash between the adjustment screw and the piston.

In accordance with a further feature of the invention, this oval-shaped tubular extension which grips the adjustment screw at its central portions is formed in the same bottom wall which contains guide slots, each of which occupy about 90° and are disposed diametrically opposite with reference to the piston axis. The angular position of the diametrical axis of said oval tubular extension with reference to the position of the arcuate slots is one of the determining factors of the elastic spring characteristics (stiffness) and, therefore, of the gripping force and resulting friction torque upon the lead screw of the device. By varying said positional arrangement, one is able to alter the gripping force at will. This can be explained by the fact that the uninterrupted piston bottom portion between the arcuated slots and the oval tube acts as a stiffening flange of said tube. This stiffening effect varies nonlinearly at approximately a power cube rate with the varying flange widths. It increases at a higher rate on the increasing flange width and decreases at a slower rate on the opposite, decreasing side.

Accordingly, a primary object of this invention is to provide an improved adjustment screw tensioning structure for piston trimmer capacitors having a nonrotating piston which structure is integral with the piston.

Another object of this invention is to provide a novel, nonrotating piston trimmer capacitor which is inexpensive, having a minimum number of components and which has increased reliability.

These and other objects of this invention will become apparent from the following description when taken in connection with the drawings in which:

FIGURE 1 is a front view of a first form of a piston trimmer capacitor constructed in accordance with the present invention.

FIGURE 2 is a cross-sectional view of FIGURE 1 taken across the section line 2—2 in FIGURE 1.

FIGURE 3 is a plan view of the left-hand end of the trimmer capacitor of FIGURE 2.

FIGURE 4 is a cross-sectional view of FIGURE 2 taken across the section line 4—4 in FIGURE 2.

FIGURE 5 is an end view looking inwardly toward the bottom of the piston of FIGURE 2.

FIGURE 6 is a partial cross-sectional view of the piston of FIGURE 5 taken across the section line 6—6 in FIGURE 5.

FIGURE 7 shows an end view of the bushing structure of FIGURE 2.

FIGURE 8 is a cross-sectional view of FIGURE 7 taken across the section line 8—8 in FIGURE 7.

FIGURE 9 is a cross-sectional view similar to FIGURE 2 showing a second form of the piston trimmer capacitor having a simplified bushing construction.

FIGURE 10 is a plan view of the washer or lug portion of FIGURE 9 used to form the dielectric tube support and adjustment screw support.

FIGURE 11 is a right-hand end view of FIGURE 10.

FIGURE 12 is a cross-sectional view of FIGURE 10 taken across the section line 12—12 in FIGURE 10.

Referring first to FIGURES 1 to 8, there is illustrated therein a piston trimmer capacitor having a non-rotating piston and which comprises a main bushing support 20, which has an enlarged flange 21, which receives a main dielectric tube 22 in the usual manner. Bushing 20 has a tubular extending body portion 23, which is threaded with a thread 24 for mounting purposes, and has a flat 25 thereon in the usual manner. A cavity 26 is formed in the bushing 20, which extends to opening 27 in the plane of flange 21, and then through the remainder of the bushing.

It is to be noted that the portion to the left of flange 21 in FIGURES 2, 7 and 8 is initially a continuous hollow cylinder. In accordance with the present invention, two opposite quadrants of this cylinder are machined in a straddle-milling operation or the equivalent thereof, so that only sections 30 and 31 remain, which will hereinafter be termed guide rail sections 30 and 31. Because of the straddle-milling technique, guide rail sections 30 and 31 have flat and parallel end surfaces 32–33 and 34–35, where surfaces 32 and 34 are in the same plane which is parallel to and spaced from a second plane containing surfaces 33 and 35. The free ends of guide rails 30 and 31 then have an inwardly tapered section 36, preferably formed prior to the straddle-milling operation.

The guide posts 30 and 31 of the main support bushing 20 are concentric with the dielectric tube 22, with the dielectric tube 22 having metallized coatings 40 and 41 thereon, as shown in FIGURES 2, 3 and 4. Coating 40 is used to permit the soldering of the tube 22 to metallic flange 21, while coating 41 serves as the fixed electrode of the capacitor. A terminal wire 43, or any other suitable terminal means, is then electrically connected to electrode 41, as by soldering or the like, to provide a convenient means for electrical connection to electrode 41. The capacitor movable electrode is formed by the piston 45, which is a conductive piston formed by drawing or any other manner, and which has a bottom section 46. The exterior diameter of piston 45 is closely fitted within the interior of dielectric tube 22 where, however, sufficient clearance is provided to permit axial movement of piston 45 within the tube.

Two openings 47 and 48 are pierced in the bottom wall 46 of the piston which openings generally conform on their exterior diameters to the arcuate shape of guide rails 30 and 31, respectively. In forming openings 47 and 48, it is important that the ends of these openings or slots have flat parallel ends, shown in FIGURE 5, as flat parallel ends 50 and 51 for slot 47 and ends 52–53 for slot 48. The flat ends 50 and 53 to receive the corresponding flat ends of guide rails 30 and 31 with a relatively close fit. Thus, the complete guide function for the prevention of rotation of piston 45 is accomplished by the engagement between the flat side surfaces of guide posts 30 and 31 with the corresponding and parallel flat slot ends 50 to 53 of FIGURE 5.

The central portion of bottom 46 of piston 45 is then extruded inwardly, as best shown in FIGURES 5 and 6, to form an inwardly extending oval tube 60, having a major axis lying along the section line 6—6 in FIGURE 5. It is to be noted that the axis of symmetry of slots 47 and 48, shown in FIGURE 5, is represented by line 61 which is perpendicular to the axis of piston 45.

In accordance with an important feature of the invention, the major axis of oval-shaped tube 60 is at about a 10° angle to the line of symmetry 61.

A suitable threading tool is then used which would normally form a circular thread to form threaded portions 62 and 63, best shown in FIGURES 5 and 6, in the opposing and radially flexible surfaces of oval-shaped tubular opening 60. Because of the oval shape of opening 60, its opposing walls, containing threads 62 and 63, deflect inwardly to securely grip an adjustment screw, which is subsequently threaded into thread portions 62 and 63.

The adjustment screw for moving piston 45 is shown in FIGURES 1 to 4 as comprising the threaded shank 70, which has an enlarged flange 71, an annular groove 72 and an enlarged head 73, having a tool-receiving slot 74. The flange 71 is captured behind the inwardly projecting shoulder of opening 27 of bushing 20 to prevent axial movement of adjustment screw 70 to the left. A suitable gasket 75 is captured in groove 72 to seal the interior of the capacitor.

The end of adjustment screw 70 is then formed with a hollow cylinder portion 76 which extends through a central opening in the spring washer 78 and a central opening in a low-friction washer 77. The end of tubular portion 76 is then rolled outwardly, as illustrated in FIGURES 2 and 3, in order to capture the spring washer 78.

Thus, the spring washer 78, along with washer 77, and rolled-over portion 76, secure the free end of adjustment screw 70 to the end faces of guide rails 30 and 31, with the right-hand end of adjustment screw 70 captured by the engagement of its flange 71 with the shoulder opening 27.

Clearly, when the adjustment screw 70 is rotated, the piston 45 will traverse axially along adjustment screw 70 without rotating in view of the guide rails 30 and 31 extending through slots 47 and 48 in the piston bottom 46. Moreover, the oval-shaped portion 60 is pressed inwardly on the adjustment screw, thereby to provide the desired adjustment torque required to rotate the screw 70 in the first instance and to absorb any backlash that would otherwise exist between the threads of adjustment screw 70 and the threaded regions 62 and 63 (FIGURE 5) within the member 60.

FIGURES 9 to 12 illustrate a capacitor of the type shown in FIGURES 1 to 8 where, however, a simplified bushing construction is used. In all other regards, the two structures may be identical and similar numerals in FIGURES 9 to 12 identify components similar to those of FIGURES 1 to 8.

In FIGURE 9, the bushing structure 20 is composed of a simple tubular-shaped conductive body 90 having guide rails 30 and 31 extending from the solid right-hand portion.

In particular, the guide rails 30 and 31 extend from the right-hand surface of a washer or pigtail lug 91. Note that cylinder 90 has an extremely simple shape, having been machined to form the desired guide rails 30 and 31 and being further machined to have a shoulder 92 thereon.

The washer, or pigtail lug 91, best shown in FIGURES 10, 11 and 12, is composed of a main body portion 93, having a central opening 94 and slots 95 and 96 which pass the guide rails 30 and 31. A pair of lead-type legs 97 and 98 then extend from main body 93 to permit easy electrical connection to the bushing in miniature circuit component applications. The two bushing portions 90 and 91 are simply assembled, as by sliding guide legs 30 and 31 through openings 95 and 96 in member 93 and thereafter brazing or soldering together as shown in FIGURE 9.

The opening 94 has a sufficiently small diameter to capture flange 71 of adjustment screw 70 in the usual manner with the opposite end or free end of adjustment screw 70 connected to the ends of guides 30 and 31, as described in FIGURES 1 to 8.

Note that screw flange 71 and bushing flange 21 engage one another over a conical engaging surface to enhance rotation lead screw accuracy.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A piston for a nonrotating piston trimmer capacitor; said piston comprising a hollow conductive cylinder having a closed end portion perpendicular to the axis of said cylinder; said closed end portion having a guide opening means therethrough for receiving a guide; said guide opening means being radially displaced from said axis of said cylinder; said closed end portion having an oval-shaped screw receiving opening therethrough symmetrically disposed around said axis and an oval-shaped cylinder extending from said oval-shaped opening; the opposing walls of said oval-shaped cylinder having cooperating portions of a thread therein extending along the length of said oval-shaped cylinder; said thread having a diameter less than the length of the major axis of said oval-shaped opening.

2. The piston of claim 1 wherein said guide opening means comprises first and second arcuate slots symmetrically disposed around said axis of said cylinder.

3. The piston of claim 2 wherein said first and second slots are symmetrically disposed on opposite sides of a line perpendicular to said axis; the major axis of said opening disposed at an angle greater than zero degrees to said line.

4. The piston of claim 2 wherein the opposite ends of said arcuate slots are flat and lie in respective planes parallel to one another.

5. The piston of claim 3 wherein said angle is about 10 degrees.

6. The piston of claim 5 wherein the opposite ends of said arcuate slots are flat and lie in respective planes parallel to one another.

7. A nonrotating piston trimmer capacitor comprising, in combination; a support bushing structure; an adjustment screw; a dielectric tube having an electrode thereon and a piston; said dielectric tube connected to and extending from a portion of said support bushing; said adjustment screw connected to said support bushing and extending into the interior of said dielectric tube; means in said bushing for rotatably mounting said adjustment screw and for axially fixing the position of said adjustment screw; said piston positioned within said dielectric tube and axially movable therein; said bushing having guide rail means extending therefrom parallel with said adjustment screw and into said dielectric tube; said piston comprising a hollow conductive cylinder having a closed end portion perpendicular to the axis of said cylinder, said closed end portion having a guide opening means therethrough for receiving a guide; said guide opening means being radially displaced from said axis of said cylinder; said closed end portion having an oval-shaped screw receiving opening therethrough symmetrically disposed around said axis and an oval-shaped cylinder extending from said oval-shaped opening; the opposing walls of said oval-shaped cylinder having cooperating portions of a thread therein extending along the length of said oval-shaped cylinder; said thread having a diameter less than the length of the major axis of said oval-shaped opening; said adjustment screw having a threaded exterior threadably received by said thread in said oval-shaped cylinder.

8. The device as het forth in claim 7 wherein said guide rail means includes first and second guide rail portions having arcuate sections; and wherein said guide opening means comprises first and second arcuate slots symmetrically disposed around said axis of said cylinder.

9. The piston of claim 8 wherein said first and second slots are symmetrically disposed on opposite sides of a line perpendicular to said axis; the major axis of said opening disposed at an angle greater than zero degrees to said line.

10. The piston of claim 9 wherein said angle is about 10 degrees.

11. The piston of claim 10 wherein the opposite ends of said arcuate slots are flat and lie in respective planes parallel to one another.

References Cited

UNITED STATES PATENTS

| 2,314,756 | 3/1943 | Bedford. |
| 2,343,067 | 2/1944 | Luce. |
| 2,376,927 | 4/1945 | Luce. |
| 3,263,140 | 7/1966 | Lafer et al. |
| 3,273,031 | 8/1966 | Lafer. |

ELLIOT A. GOLDBERG, Primary Examiner

U.S. Cl. X.R.

151—21